(12) United States Patent
Romanov (10) Patent No.: US 11,131,199 B2
(45) Date of Patent: Sep. 28, 2021

(54) IMPINGEMENT COOLING WITH IMPINGEMENT CELLS ON IMPINGED SURFACE

(71) Applicant: United Technologies Corporation, Farmington, CT (US)

(72) Inventor: Dmitriy A. Romanov, Wells, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 59 days.

(21) Appl. No.: 16/672,781

(22) Filed: Nov. 4, 2019

(65) Prior Publication Data
US 2021/0131290 A1   May 6, 2021

(51) Int. Cl.
| | |
|---|---|
| *F01D 5/18* | (2006.01) |
| *F23R 3/00* | (2006.01) |
| *F01D 11/08* | (2006.01) |
| *F01D 9/04* | (2006.01) |
| *F01D 25/12* | (2006.01) |

(52) U.S. Cl.
CPC ............. *F01D 5/187* (2013.01); *F01D 5/186* (2013.01); *F01D 5/188* (2013.01); *F01D 11/08* (2013.01); *F23R 3/002* (2013.01); *F23R 3/005* (2013.01); *F01D 9/041* (2013.01); *F01D 25/12* (2013.01); *F05D 2220/323* (2013.01); *F05D 2240/11* (2013.01); *F05D 2240/81* (2013.01); *F05D 2250/18* (2013.01); *F05D 2260/201* (2013.01); *F05D 2260/202* (2013.01); *F05D 2260/22141* (2013.01); *F23R 2900/03044* (2013.01); *F23R 2900/03045* (2013.01)

(58) Field of Classification Search
CPC .......... F01D 5/187; F01D 5/186; F01D 5/188; F05D 2240/81
USPC .............................................. 415/116; 416/95
See application file for complete search history.

(56) References Cited

U.S. PATENT DOCUMENTS 5,259,730 A * 11/1993 Damlis .................. B23P 15/04
                                                              416/96 A
5,533,864 A    7/1996 Nomoto et al.
(Continued)

FOREIGN PATENT DOCUMENTS

| CN | 103075202 A | 5/2013 |
|---|---|---|
| EP | 1043479 A2 | 10/2000 |

(Continued)

OTHER PUBLICATIONS

European Search Report for European Application No. 20205461.5, International Filing Date Nov. 3, 2020, dated Jan. 18, 2021, 8 pages.

*Primary Examiner* — Mark A Laurenzi
*Assistant Examiner* — Mickey H France
(74) *Attorney, Agent, or Firm* — Cantor Colburn LLP (57) ABSTRACT

Impingement assemblies and components of gas turbine engines are described. The impingement assemblies include an impingement plate having a plurality of impingement holes formed therein and an impingement surface arranged relative to the impingement plate with an impingement cavity defined between the impingement plate and the impingement surface. A raised wall is configured on the impingement surface and extends in a direction from the impingement surface toward the impingement plate and defines a plurality of impingement cells each having a geometric shape on the impingement surface.

20 Claims, 6 Drawing Sheets

(56) References Cited

U.S. PATENT DOCUMENTS

| | | | |
|---|---|---|---|
| 6,439,846 B1* | 8/2002 | Anderson | F01D 5/187 416/96 R |
| 9,771,809 B2 | 9/2017 | Fujimoto et al. | |
| 9,957,812 B2 | 5/2018 | Okita et al. | |
| 10,337,339 B2* | 7/2019 | Harris | B22F 10/20 |
| 2002/0062945 A1* | 5/2002 | Hocker | F01D 5/189 165/53 |
| 2003/0140632 A1* | 7/2003 | Dailey | F23R 3/04 60/752 |
| 2010/0034638 A1 | 2/2010 | Chambers et al. | |
| 2012/0272521 A1* | 11/2012 | Lee | F23R 3/46 29/888.01 |
| 2014/0238030 A1* | 8/2014 | Gerendas | F23R 3/06 60/754 |
| 2014/0338304 A1* | 11/2014 | Schilp | F01D 9/023 60/39.23 |
| 2018/0179905 A1* | 6/2018 | Fox | F01D 9/023 |

FOREIGN PATENT DOCUMENTS

| | | |
|---|---|---|
| EP | 3048262 A1 | 7/2016 |
| EP | 3214270 A1 | 9/2017 |
| EP | 3379148 A1 | 9/2018 |
| EP | 3425174 A1 | 1/2019 |
| JP | 2013019348 A | 1/2013 |

* cited by examiner

IMPINGEMENT COOLING WITH IMPINGEMENT CELLS ON IMPINGED SURFACE

BACKGROUND

The subject matter disclosed herein generally relates to gas turbine engines and, more particularly, to impingement cooling with increased cross-flow area for components of gas turbine engines.

Impingement is an effective, widely used type of cooling system that is employed in jet propulsion type systems (e.g., gas turbine engines). Various components of gas turbine engines can benefit from impingement cooling in order to maintain, for example, appropriate operational conditions and/or to maximize component life. For example, impingement cooling may be employed on vanes, blades, combustor panels, and blade outer air seals ("BOAS"). Accordingly, it may be advantageous to provide improved impingement cooling to improve part life or provide other features/benefits.

SUMMARY

According to some embodiments, impingement assemblies are provided. The impingement assemblies include an impingement plate having a plurality of impingement holes formed therein, an impingement surface arranged relative to the impingement plate with an impingement cavity defined between the impingement plate and the impingement surface, and a raised wall configured on the impingement surface and extending in a direction from the impingement surface toward the impingement plate, wherein the raised wall defines a plurality of impingement cells each having a geometric shape on the impingement surface.

In addition to one or more of the features described above, or as an alternative, further embodiments of the impingement assemblies may include that the geometric shape is rounded rectangular.

In addition to one or more of the features described above, or as an alternative, further embodiments of the impingement assemblies may include that the geometric shape is at least one of a rectangle, a square, a triangle, a pentagon, a circle, an oval, and a hexagon.

In addition to one or more of the features described above, or as an alternative, further embodiments of the impingement assemblies may include that each impingement cell is geometrically center-aligned with a respective one of the impingement holes.

In addition to one or more of the features described above, or as an alternative, further embodiments of the impingement assemblies may include that at least one impingement cell is geometrically center-offset with a respective one of the impingement holes.

In addition to one or more of the features described above, or as an alternative, further embodiments of the impingement assemblies may include that the raised wall has a wall height such that a distance between a top of the raised wall and the impingement plate is greater than a distance between a floor of each impingement cell and the impingement plate.

In addition to one or more of the features described above, or as an alternative, further embodiments of the impingement assemblies may include that the impingement surface is a hot portion of a component of a gas turbine engine.

In addition to one or more of the features described above, or as an alternative, further embodiments of the impingement assemblies may include that the component is one of an airfoil, a blade outer air seal, and a combustor panel.

In addition to one or more of the features described above, or as an alternative, further embodiments of the impingement assemblies may include that the raised wall is one of curved, bumper-shaped, or rib-shaped in cross-section.

In addition to one or more of the features described above, or as an alternative, further embodiments of the impingement assemblies may include that the raised wall defines a gridded pattern on the impingement surface.

According to some embodiments, components of gas turbine engines are provided. The components include an impingement plate having a plurality of impingement holes formed therein, an impingement surface arranged relative to the impingement plate with an impingement cavity defined between the impingement plate and the impingement surface, and a raised wall configured on the impingement surface and extending in a direction from the impingement surface toward the impingement plate, wherein the raised wall defines a plurality of impingement cells each having a geometric shape on the impingement surface.

In addition to one or more of the features described above, or as an alternative, further embodiments of the components may include that the geometric shape is rounded rectangular.

In addition to one or more of the features described above, or as an alternative, further embodiments of the components may include that the geometric shape is at least one of a rectangle, a square, a triangle, a pentagon, a circle, an oval, and a hexagon.

In addition to one or more of the features described above, or as an alternative, further embodiments of the components may include that each impingement cell is geometrically center-aligned with a respective one of the impingement holes.

In addition to one or more of the features described above, or as an alternative, further embodiments of the components may include that at least one impingement cell is geometrically center-offset with a respective one of the impingement holes.

In addition to one or more of the features described above, or as an alternative, further embodiments of the components may include that the raised wall has a wall height such that a distance between a top of the raised wall and the impingement plate is greater than a distance between a floor of each impingement cell and the impingement plate.

In addition to one or more of the features described above, or as an alternative, further embodiments of the components may include that the component is one of an airfoil, a blade outer air seal, and a combustor panel.

In addition to one or more of the features described above, or as an alternative, further embodiments of the components may include that the raised wall is one of curved, bumper-shaped, or rib-shaped in cross-section.

In addition to one or more of the features described above, or as an alternative, further embodiments of the components may include that the raised wall defines a gridded pattern on the impingement surface.

According to some embodiments, gas turbine engines are provided. The gas turbine engines include a hot section component having a hot wall, an impingement plate having a plurality of impingement holes formed therein, the impingement plate arranged relative to the hot wall, an impingement surface defined on a surface of the hot wall and arranged relative to the impingement plate with an impingement cavity defined between the impingement plate and the impingement surface, and a raised wall configured on the impingement surface and extending in a direction from the impingement surface toward the impingement plate, wherein the raised wall defines a plurality of impingement cells each having a geometric shape on the impingement surface.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
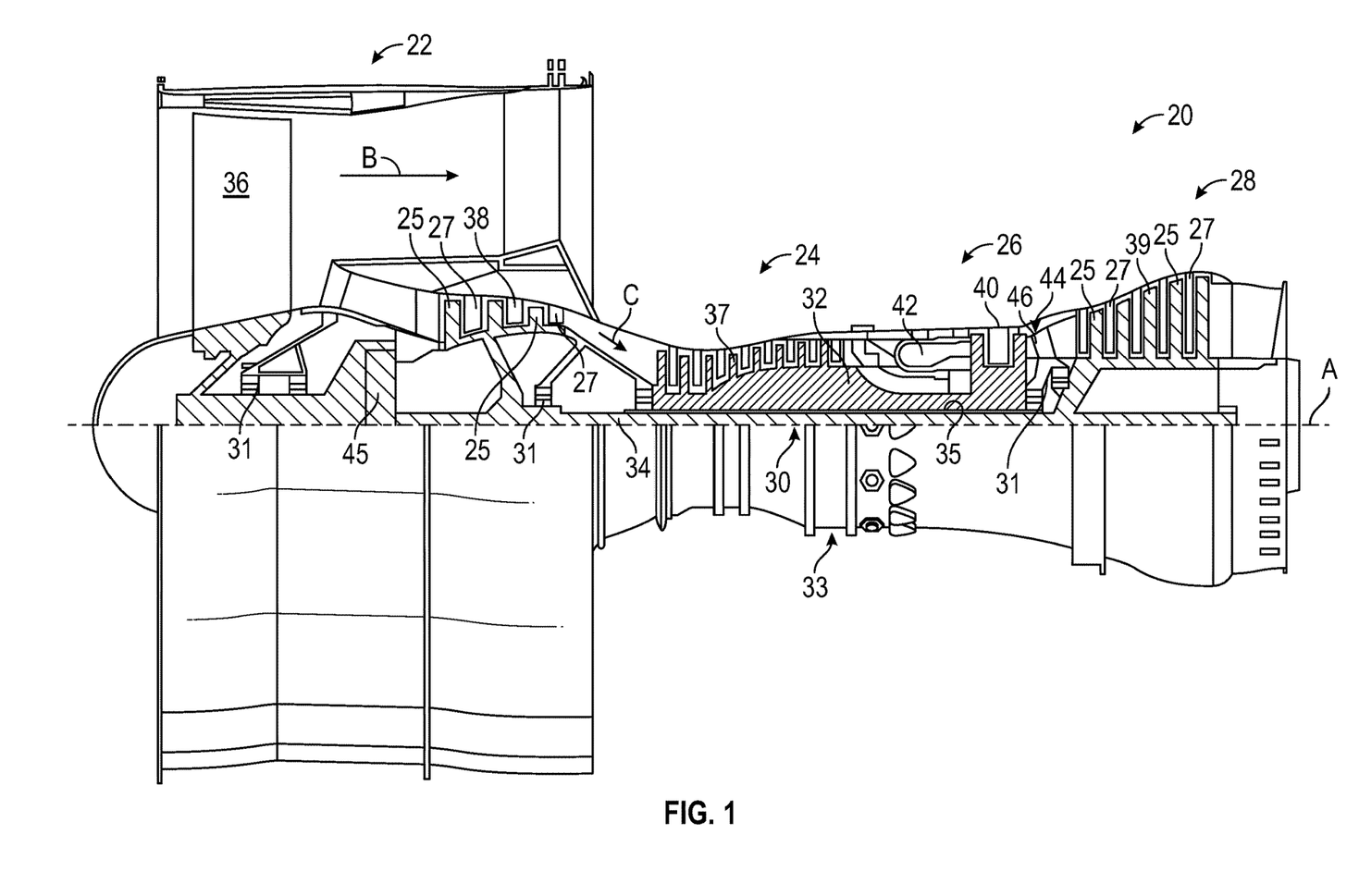
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration, as the teachings may be applied to other types of engines such as, but not limited to, turbojets, turboshafts, and other turbofan configurations (e.g., wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT")).

Figure 2:
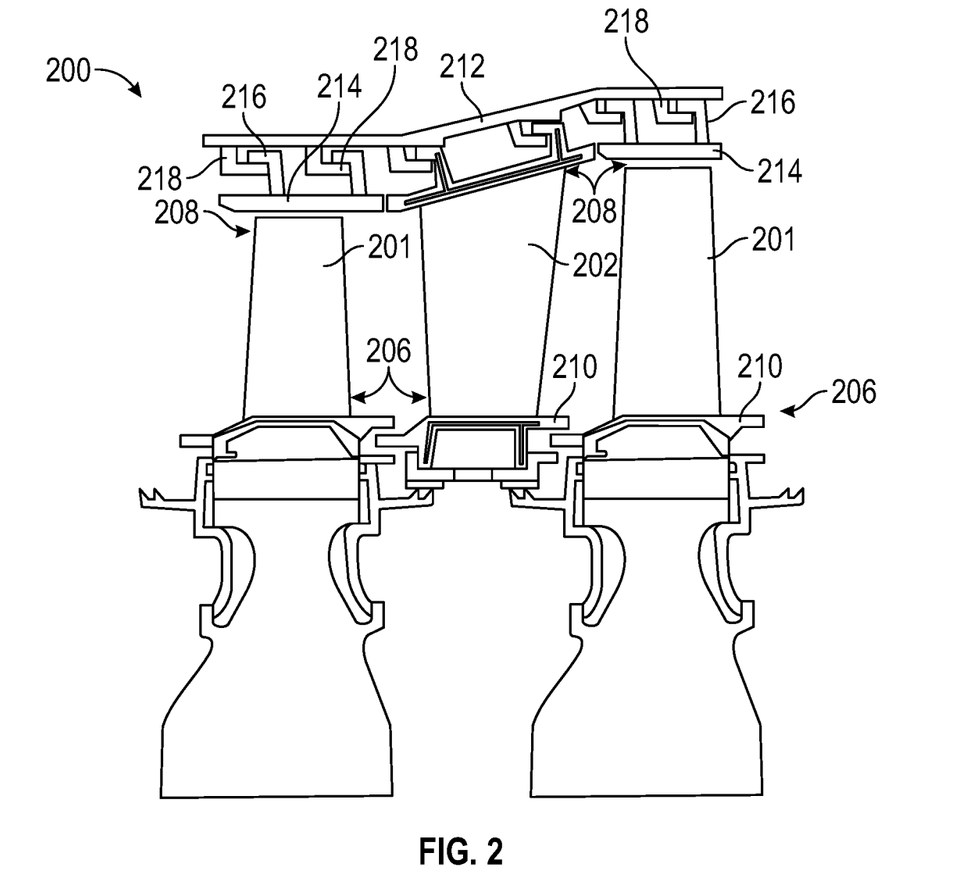
FIG. 2 is a schematic illustration of a section of a gas turbine engine that may employ various embodiments disclosed herein.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the airfoils 201, 202 that may extend either from the inner diameter 206 or the outer diameter 208 of the airfoil 201, 202. The partitions may extend for a portion of the length of the airfoil 201, 202, but may stop or end prior to forming a complete wall within the airfoil 201, 202. Thus, each of the airfoil cavities may be fluidly connected and form a fluid path within the respective airfoil 201, 202. The blades 201 and the vanes 202 may include platforms 210 located proximal to the inner diameter thereof. Located below the platforms 210 may be airflow ports and/or bleed orifices that enable air to bleed from the internal cavities of the airfoils 201, 202. A root of the airfoil may connected to or be part of the platform 210.

The turbine 200 is housed within a case 212, which may have multiple parts (e.g., turbine case, diffuser case, etc.). In various locations, components, such as seals, may be positioned between airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

Impingement cooling can be used to provide cooling to various components of gas turbine engines, including, but not limited to, blades, vanes, blade outer air seals, combustor panels, other hot section components, etc. Impingement-type cooling can be adjusted or optimized by selecting or defining a specific or desired arrangement of the characteristics or parameters of the impingement holes. For example, impingement hole diameter, impingement hole spacing, and depth-to-diameter ratio of the impingement hole can all be adjusted, selected, or otherwise designed to achieve desired impingement cooling. As known in the art, the impingement hole depth is an important factor for effective cooling and optimal or preferred impingement hole depth may tend toward being small (e.g., a short or shallow impingement hole). However, having a small (e.g., short depth) impingement hole depth can increase cross-flow air velocity that "blows away" impingement jets and therefore reduces impingement effectiveness.

Figure 3A:
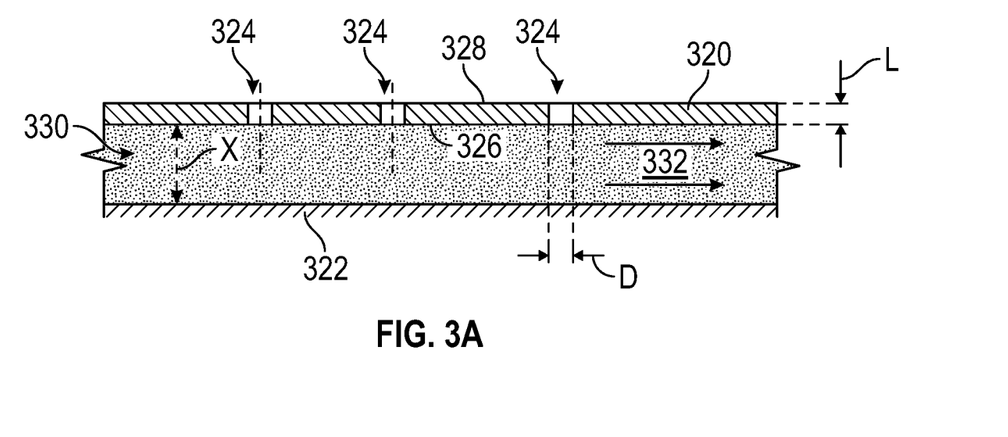
FIG. 3A is a schematic illustration of an impingement plate positioned relative to an impingement surface of a component of a gas turbine engine.
Figure 3B:
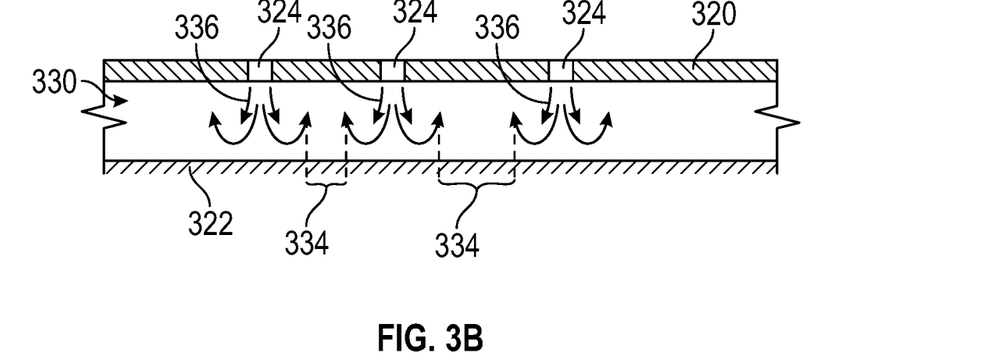
FIG. 3B is a schematic of a portion of the cooling scheme achieved by the impingement plate of FIG. 3A.

Turning now to FIGS. 3A-3B, side view illustrations of an impingement plate 320 positioned proximate to an impingement surface 322 is shown. The impingement surface 322 is a surface of a component that is to be cooled (e.g., a surface of an airfoil, a surface of a combustor, a surface of a BOAS, etc.). The impingement surface 322 may be a backside of a hot wall or portion of a hot section component of a gas turbine engine.

The impingement plate 320 is positioned about and near the impingement surface 322 to provide cooling to the impingement surface 322. As shown, the impingement plate 320 includes a plurality of impingement holes 324. The impingement holes 324 can be arranged in a grid-like pattern on the impingement plate 320 or may be otherwise arranged or positioned to provide a desired cooling to the impingement surface 322. An impingement cavity is defined as the space between the impingement plate 320 and the impingement surface 322.

The impingement plate 320 has a first surface 326 and a second surface 328, with the impingement holes 324 extending through the impingement plate 320 from the first surface 326 to the second surface 328. The impingement plate 320 has an impingement plate thickness (i.e., the distance from the first surface 326 to the second surface 328) that defines an impingement hole depth L. Further, each impingement hole 324 has an impingement hole diameter D. A cross-flow area 330 is defined between the impingement surface 322 and the first surface 326 of the impingement plate 320. The cross-flow area 330 has an impingement cavity height X that is defined as the distance between the first surface 326 and the impingement surface 322, as shown. The cross-flow area 330 defines at least a portion of the impingement cavity that is defined between the impingement plate 320 and the impingement surface 322.

As noted above, typically it is desirable to provide impingement cooling by optimizing the impingement hole diameter D and positioning the impingement plate 320 at a specific impingement hole height X from the impingement surface 322. However, having a small (e.g., short depth) impingement hole depth can increase cross-flow air velocity that "blows away" impingement jets and therefore can reduce impingement effectiveness. That is, air flowing within the cross-flow area 330 can reduce the effectiveness of impingement cooling by having too high of a velocity as the cross-flow air passes through the cross-flow area 330. As shown in FIG. 3, the cross-flow air 332 flows in a cross-flow direction between the impingement plate 320 and the impingement surface 322 (e.g., left-to-right in FIG. 3, and indicated by the arrows of cross-flow air 332).

Additionally, as shown in FIG. 3B, static zones 334 may be formed at areas of the impingement surface 322 that are between the location of the impingement holes 324. The static zones 334 are formed as a result of adjacent impinging air 336 that interacts and cancel each other out such that no cooling (or minimal cooling) may result. That is, as the impinging air 336 impinges upon the impingement surface 322, the cooling air may be reflected off the impingement surface 322 and cancel by interaction with adjacent flows of impinging air 336. Accordingly, the combination of cross-flow air 332 in the cross-flow direction and the static zones 334, cooling effectiveness provided by the impingement holes 324 may be reduced.

Figure 4:
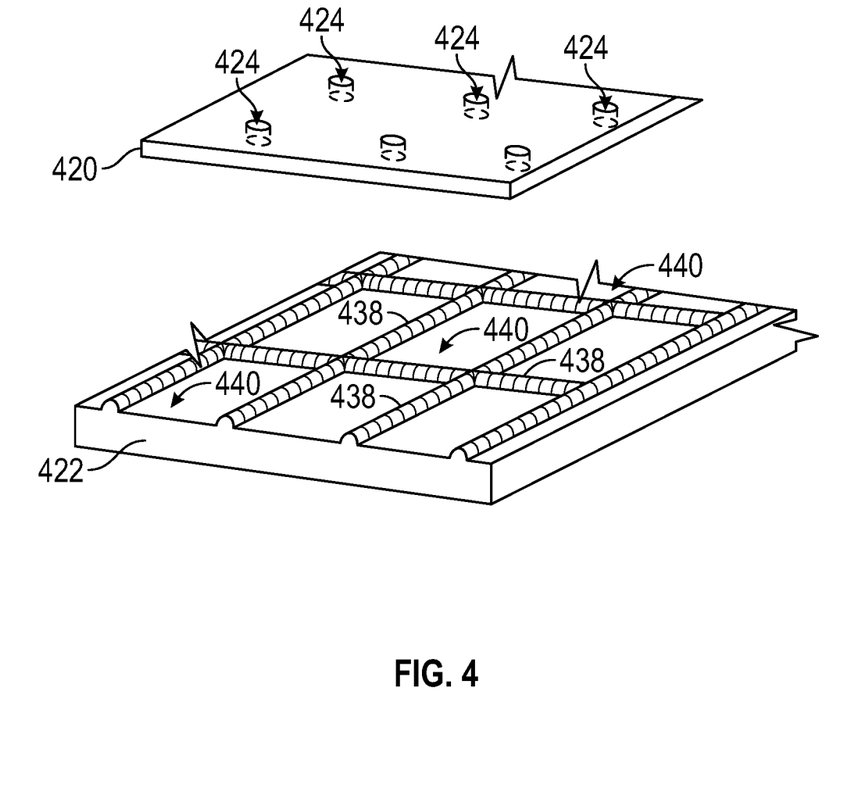
FIG. 4 is a schematic illustration of an impingement plate in accordance with an embodiment of the present disclosure positioned relative to an impingement surface of a component of a gas turbine engine.

Turning now to FIG. 4, an isometric illustration of an impingement plate 420 positioned proximate to an impingement surface 422 in accordance with an embodiment of the present disclosure is shown. The impingement surface 422 is a surface of a component that is to be cooled (e.g., a surface of an airfoil, a surface of a combustor, a surface of a BOAS, etc.). The impingement plate 420 is positioned relative and near the impingement surface 422 to provide cooling to the impingement surface 422. As shown, the impingement plate 420 includes a plurality of impingement holes 424. The impingement holes 424 can be arranged in a grid-like pattern on the impingement plate 420 or may be otherwise arranged or positioned to provide a desired cooling to the impingement surface 422.

The impingement surface 422, in this embodiment, include a gridded pattern defined by a raised wall 438 that extends from the impingement surface 422 toward the impingement plate 420. The raised wall 438 defines a plurality of impingement cells 440. The impingement cells 440 defined by a flat surface that is part of the impingement surface 422 and bounded by the raised wall 438. The gridded pattern of the raised wall 438 defines the geometric shape of each impingement cell 440. The gridded pattern of the raised wall 438 may be arranged relative to anticipated or modeled static zones (e.g., static zones 334 shown in FIG. 3B), such that the raised walls 438 are arranged where a static zone would exist if no raised wall was present.

The impingement cells 440 may be associated with an impingement hole 424 of the impingement plate 420. For example, the impingement cells 440 defined by the raised walls 438 may be centered relative to a corresponding impingement hole 424 such that impinging air through a respective impingement hole 424 and toward the impingement surface 422 will be centered within a respective impingement cell 440 defined on the impingement surface 422.

Because the raised walls 438 are arranged at the locations of anticipated static zones, as the impinging air reflects off the impingement surface 422 and back toward the impingement plate 420, the air will flow along surfaces of the raised walls 438 and provide cooling to the material thereof. As such, the static zones of reduced or no cooling may be eliminated. Furthermore, the raised walls may also address cross-flow concerns. For example, the raised walls 438 may protect the floor of each impingement cell 440 (i.e., part of the impingement surface 422) from a cross-flow. That is, the raised walls 438 may block a portion of the cross-flow, and particularly a portion of the cross-flow around the location at which an impinging air impinges upon the impingement surface 422. As such, the cross-flow will have reduced impact, such as a reduced ability to push or distort the impinging air, thereby increasing an efficiency or efficacy of the impinging air directed on the impingement surface 422 within each impingement cell 440.

The raised walls 438 may be curved, bumper-shaped, or rib-shaped such that the may be conducive to cooling flow flowing along the surface of the raised walls 438 from a respective impingement cell 440. As such, in cross-section, the geometry of the raised wall 438 may be domed or protruding from the impingement surface 422.

Figure 5:
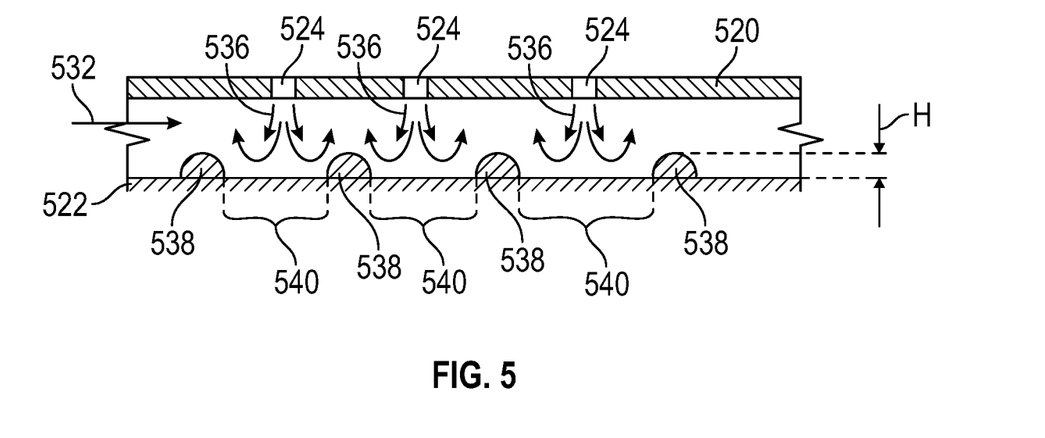
FIG. 5 is a schematic of a portion of a cooling scheme achieved by an impingement plate and impingement surface configuration in accordance with an embodiment of the present disclosure.

Turning now to FIG. 5, a cross-sectional illustration of an impingement surface 522 arranged relative to an impingement plate 520 in accordance with an embodiment of the present disclosure is shown. The impingement plate 520 includes a plurality of impingement holes 524 that are arranged to directed impinging air 536 toward the impingement surface 522. The impingement surface 522 includes a gridded pattern defined by a raised wall 538 that extends from the impingement surface 522 toward the impingement plate 520. The raised wall 538 may be a continuous wall structure or pattern that defines a plurality of impingement cells 540, with a floor of each impingement cell 540 being a portion of the impingement surface 522.

As shown in FIG. 5, a portion of the impinging air 536, after impinging upon the floor of the impingement cells 540, will flow along or over surfaces of the raised wall 538. This flow may enable heat flux conduction from the material of the impingement surface 522 (e.g., a hot section surface of a gas turbine engine) and thus maximum temperatures of the material may be reduced. Accordingly, typical static zones (described above) may be reduced or eliminated, and additional or improved cooling may be provided at locations of an impingement surface between impingement holes of an impingement plate.

Furthermore, the raised wall 538 may also reduce the impacts of cross-flow 532. Specifically, because the raised wall 538 extends from the impingement surface 522 toward the impingement plate 520, the cross-flow 532 may be blocked and thus will not reduce the effectiveness of the impinging air 536 as it is impinged upon the impingement surface 522. As shown in FIG. 5, the raised wall 538 has a wall height H that is a height of the raised wall 538 in a direction extending from the impingement surface 522 toward the impingement plate 520. Because of the increased height H of the raised wall 538 relative to the impingement surface 522, the cross-flow 532 will have less volume to pass through, which will increase a velocity of the cross-flow 532, which can encourage improved heat removal at the location of the raised wall 538. As such, improved convection cooling may be provided in locations of typical or conventional static zones (described above). That is, the raised wall 538 will modify the volume of the impingement cavity defined between the impingement plate 520 and the impingement surface 522.

In some embodiments, the impingement cells defined by a patterned raised wall, described above, may be substantially uniform. In other embodiments, the size, shape, and geometry of each impingement cell may be different, or sets of different size, shape, and geometry impingement cells may be employed and defined by a raised wall that is on an impingement surface.

Figure 6:
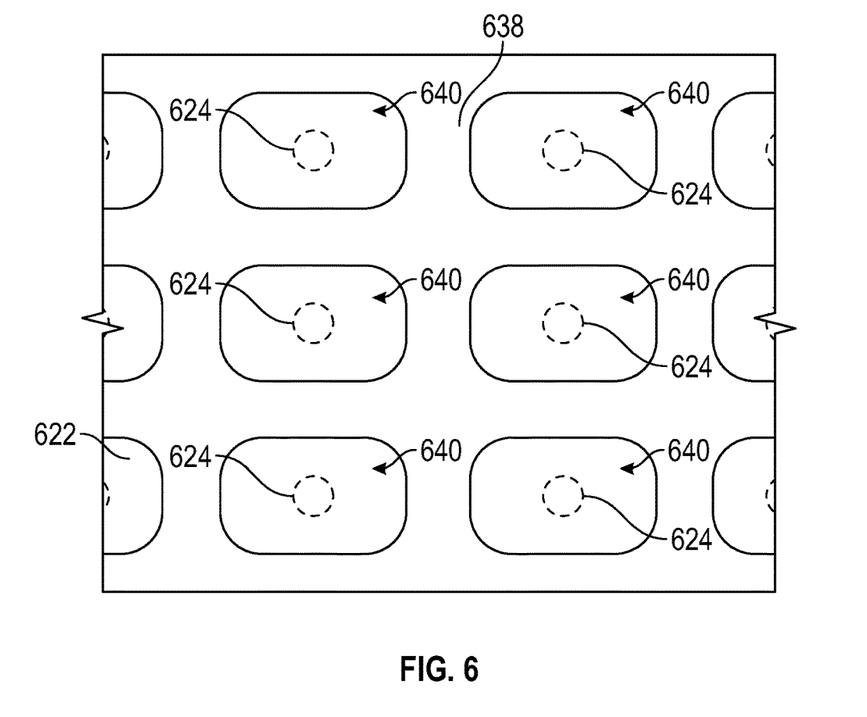
FIG. 6 is a top-down plan view illustration of an impingement surface arranged in accordance with an embodiment of the present disclosure.

Turning to FIG. 6, at top down plan view illustration of an impingement surface 622 having a raised wall 638 extending therefrom is shown. The raised wall 638 defines a plurality of impingement cells 640, as described above. In this embodiment, each impingement cell is aligned and centered on the location of a respective impingement hole 624 that is in an impingement plate that is arranged relative to the impingement surface 622.

In this embodiments, the impingement cells 640 have generally rectangular geometry (e.g., bath-tub shaped, rounded rectangle, etc.), with curved corners. Although shown with the impingement cells 640 having a substantially rectangular shape, with curved corners, such geometry is not so limiting. Furthermore, in FIG. 6, each of the impingement cells 640 is shown being the same as all other impingement cells 640. However, in other embodiments, there may be variation in the shape, size, geometry, etc. of the impingement cells. Additionally, in this embodiment, the impingement cells 640 are arranged such that the respective impingement holes 624 are center-aligned with the shape/geometry of the respective impingement cell 640. However, such alignment is not to be limiting.

Figure 7:
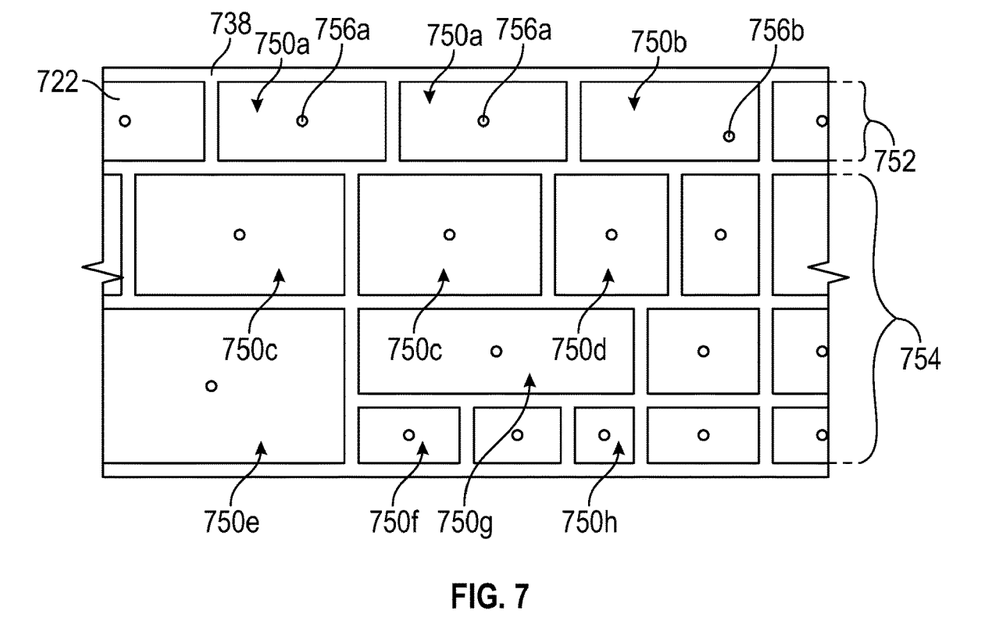
FIG. 7 is a top-down plan view illustration of an impingement surface arranged in accordance with an embodiment of the present disclosure.

Turning now to FIG. 7, at top down plan view illustration of an impingement surface 722 having a raised wall 738 extending therefrom is shown. The raised wall 738 defines a plurality of impingement cells 750a-h, which will be described in two groups, a first group 752 and a second group 754.

The first group 752 of impingement cells 750a-750b includes substantially similar and uniform impingement cell size and geometry. Some of the impingement cells 750a of the first group 752 are geometrically aligned with respective impingement holes 756a and other impingement cells 750b are arranged with a geometric center that is offset from a respective impingement hole 756b. The offset location of the impingement hole 756b relative to the geometry of the impingement cell 750b may be set based on cross-flow velocities, heating conditions on a hot side of the impingement surface 722, or based on other parameters.

The second group 754 of impingement cells 750c-750h includes a variety of geometries and sizes of impingement cells. In this illustrative configuration, each impingement cell 750c-750h is geometrically center-aligned with a respective impingement hole, however, such configuration is not to be limiting. As illustrated, some impingement cells 750c, 750e, 750f, 750g may be rectangular in shape, and other impingement cells 750d, 750h may be square in shape. Further, as shown, some impingement cells may be larger (or smaller) in one or more dimensions (e.g., length or width within the plane of the impingement surface 722) as compared to other impingement cells. It is noted, in this illustrative embodiment, the impingement cells 750a-h have substantially sharp corners (i.e., right angles), which is different from the curved or rounded corners shown and described above with respect to other embodiments.

Figure 8:
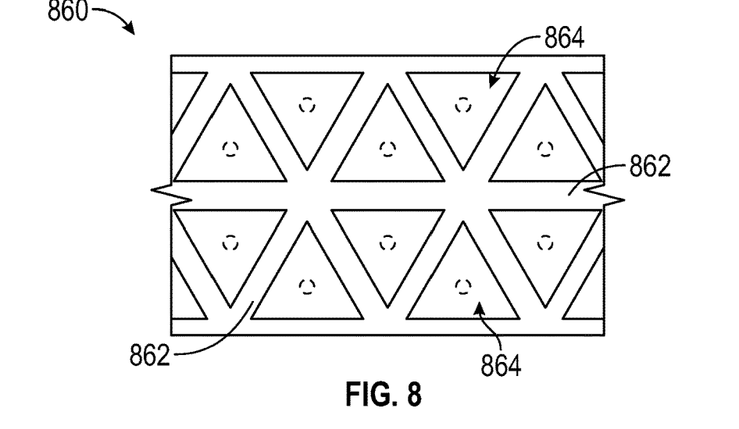
FIG. 8 is a schematic illustration of a geometric pattern of impingement cells in accordance with an embodiment of the present disclosure.
Figure 9:
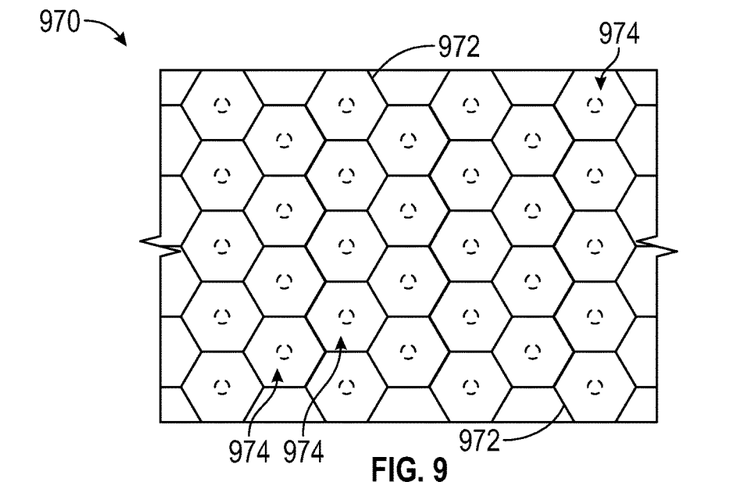
FIG. 9 is a schematic illustration of a geometric pattern of impingement cells in accordance with an embodiment of the present disclosure.
Figure 10:
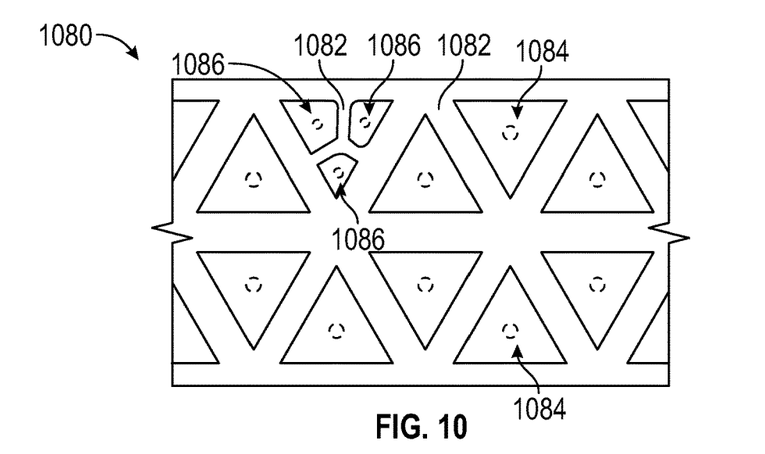
FIG. 10 is a schematic illustration of a geometric pattern of impingement cells in accordance with an embodiment of the present disclosure, with nested or sub-impingement cells arranged with respect to other impingement cells.

Furthermore, although shown and described with substantially rectangular shaped impingement cells (i.e., rectangles, squares, bath-tub shaped, rounded rectangle, etc.), such geometric shape is not to be limiting. For example, other geometric shapes may be employed without departing from the scope of the present disclosure, including, without limitation, triangles (FIG. 8; pattern 860 with raised walls 862 and triangular impingement cells 864), pentagons, hexagons (FIG. 9; pattern 970 with raised walls 972 and hexagon impingement cells 974), and other polygons (with or without curved corners), circular, oval, rounded, and/or combinations thereof. For example, various different geometries of impingement cells may be arranged on a single impingement surface such that different geometric shapes are arranged adjacent to each other (e.g., triangle next to rectangular). In each configuration, a raised wall extends in a direction toward an impingement plate (when installed relative thereto) such that respective impingement cells are defined and arranged relative to respective impingement holes within the impingement plate (whether geometrically center-aligned or geometrically center-offset). Furthermore, in some configurations, sub-impingement cells (i.e., nested) may be employed, such as shown in FIG. 10. FIG. 10 illustrates a geometric pattern 1080 of impingement cells 1084 defined by raised walls 1082, as described above, but with a set of triangular bath tub impingement cells, with sub-bath tub impingement cells 1086, and multiple impingement holes 1088 associated therewith.

Advantageously, embodiments described herein provide improved impingement cooling by partially blocking a cross-flow (with a raised wall) and enabling cooling at typical static zones because the raised wall is arranged at the static zones. Such raised walls may partially block local cross-flow and provide conduction cooling into the otherwise dead zones (static zones).

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An impingement assembly comprising:
an impingement plate having a plurality of impingement holes formed therein;
an impingement surface arranged relative to the impingement plate with an impingement cavity defined between the impingement plate and the impingement surface; and
a raised wall configured on the impingement surface and extending in a direction from the impingement surface toward the impingement plate, wherein the raised wall defines a plurality of impingement cells each having a geometric shape on the impingement surface,
wherein the plurality of impingement cells comprise a first group of impingement cells having at least one of aligned and offset cells relative to a respective impingement hole and a second group of impingement cells having aligned cells relative to a respective impingement hole,
wherein the first group of impingement cells comprise impingement cells of uniform size and geometry and the second group of impingement cells comprise cells of at least one of different geometries and sizes from the first group of impingement cells.

2. The impingement assembly of claim 1, wherein the geometric shape of at least the cells of the first group of impingement cells is rounded rectangular.

3. The impingement assembly of claim 1, wherein the geometric shape of at least the cells of the first group of impingement cells is at least one of a rectangle, a square, a triangle, a pentagon, a circle, an oval, and a hexagon.

4. The impingement assembly of claim 1, wherein the impingement surface is a surface of a combustor panel.

5. The impingement assembly of claim 1, wherein the impingement surface is a surface of a blade outer air seal.

6. The impingement assembly of claim 1, wherein the impingement surface is a surface of an airfoil.

7. The impingement assembly of claim 1, wherein the impingement surface is a hot portion of a component of a gas turbine engine.

8. The impingement assembly of claim 1, wherein the raised wall is bumper shaped in cross-section.

9. The impingement assembly of claim 1, wherein the raised wall is one of curved or rib-shaped in cross-section.

10. The impingement assembly of claim 1, wherein the raised wall defines a gridded pattern on the impingement surface.

11. A component of a gas turbine engine, the component comprising:
   an impingement plate having a plurality of impingement holes formed therein;
   an impingement surface arranged relative to the impingement plate with an impingement cavity defined between the impingement plate and the impingement surface; and
   a raised wall configured on the impingement surface and extending in a direction from the impingement surface toward the impingement plate, wherein the raised wall defines a plurality of impingement cells each having a shape on the impingement surface,
   wherein the plurality of impingement cells comprise a first group of impingement cells and a second group of impingement cells, wherein one of the first group and the second group has center-aligned cells relative to a respective impingement hole and the other of the first group and the second group has center-offset cells relative to a respective impingement hole,
   wherein the first group of impingement cells comprise impingement cells of uniform size and shape and the second group of impingement cells comprise cells of at least one of different shapes and sizes from the first group of impingement cells.

12. The component of claim 11, wherein the shape of at least the cells of the first group of impingement cells is rounded rectangular.

13. The component of claim 11, wherein the shape of at least the cells of the first group of impingement cells is at least one of a rectangle, a square, a triangle, a pentagon, a circle, an oval, and a hexagon.

14. The component of claim 11, wherein the impingement surface is a surface of a combustor panel.

15. The component of claim 11, wherein the impingement surface is a surface of a blade outer air seal.

16. The component of claim 11, wherein the impingement surface is a surface of an airfoil.

17. The component of claim 11, wherein the raised wall is bumper shaped in cross-section.

18. The component of claim 11, wherein the raised wall is one of curved or rib-shaped in cross-section.

19. The component of claim 11, wherein the raised wall defines a gridded pattern on the impingement surface.

20. A gas turbine engine comprising:
   a hot section component having a hot wall;
   an impingement plate having a plurality of impingement holes formed therein, the impingement plate arranged relative to the hot wall;
   an impingement surface defined on a surface of the hot wall and arranged relative to the impingement plate with an impingement cavity defined between the impingement plate and the impingement surface; and
   a raised wall configured on the impingement surface and extending in a direction from the impingement surface toward the impingement plate, wherein the raised wall defines a plurality of impingement cells each having a geometric shape on the impingement surface,
   wherein the plurality of impingement cells comprise a first group of impingement cells having at least one of aligned and offset cells relative to a respective impingement hole and a second group of impingement cells having aligned cells relative to a respective impingement hole,
   wherein the first group of impingement cells comprise impingement cells of uniform size and geometry and the second group of impingement cells comprise cells of at least one of different geometries and sizes from the first group of impingement cells.

* * * * *